US006510990B2

(12) United States Patent
Goodwin, III et al.

(10) Patent No.: US 6,510,990 B2
(45) Date of Patent: Jan. 28, 2003

(54) BAR CODE PROCESSING METHOD FOR A NETWORK KIOSK

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/727,340

(22) Filed: Nov. 29, 2000

(65) Prior Publication Data

US 2002/0063161 A1 May 30, 2002

(51) Int. Cl.[7] .............................................. G06K 15/00
(52) U.S. Cl. ................... 235/383; 235/472.01
(58) Field of Search .......................... 235/383, 472.01; 705/27

(56) References Cited

U.S. PATENT DOCUMENTS 5,963,916 A * 10/1999 Kaplan ........................ 705/26
5,979,757 A * 11/1999 Tracy .......................... 235/383

* cited by examiner

Primary Examiner—Harold I. Pitts
(74) Attorney, Agent, or Firm—Paul W. Martin

(57) ABSTRACT

A bar code processing method for a network kiosk which automatically obtains information about an item from identification information obtained from a bar code reader. The method includes the steps of displaying a web page associated with an item, displaying a prompt associated with the web page to have an operator use a bar code reader to read a bar code on the item, and receiving information from the bar code reader which identifies the item.

7 Claims, 4 Drawing Sheets

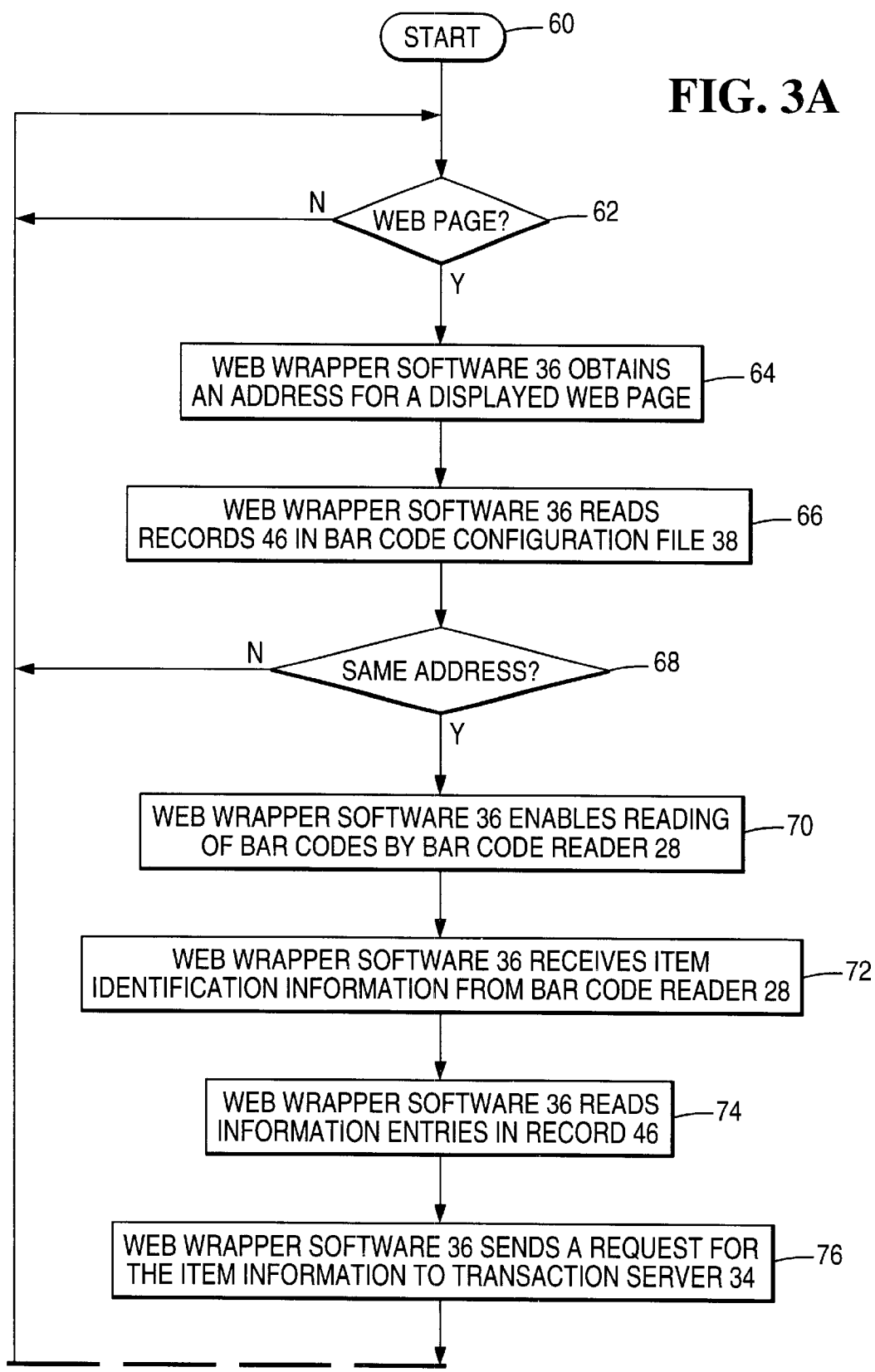

BAR CODE PROCESSING METHOD FOR A NETWORK KIOSK

BACKGROUND OF THE INVENTION

The present invention relates to self-service kiosks and more specifically to a bar code processing method for a network kiosk.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

Kiosks may receive input data from various sources. For example, kiosks may include bar code readers for facilitating customer price checks.

It would be desirable to provide a bar code processing method for a network kiosk.

SUMMARY OF THE INVENTION

In accordance with the teachings of the present invention, a bar code processing method for a network kiosk is provided.

The method includes the steps of displaying a web page associated with an item, displaying a prompt associated with the web page to have an operator use a bar code reader to read a bar code on the item, and receiving information from the bar code reader which identifies the item.

It is accordingly an object of the present invention to provide a bar code processing method for a network kiosk.

It is another object of the present invention to automatically retrieve and display information about an item in a web page in response to reading a bar code on the item.

It is another object of the present invention to activate certain links to other information in the web page in response to reading a bar code on the item.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 3A and 3B form a flow diagram illustrating the bar code processing method of the present invention.

DETAILED DESCRIPTION OF THE PREFERRED EMBODIMENT

Figure 1:
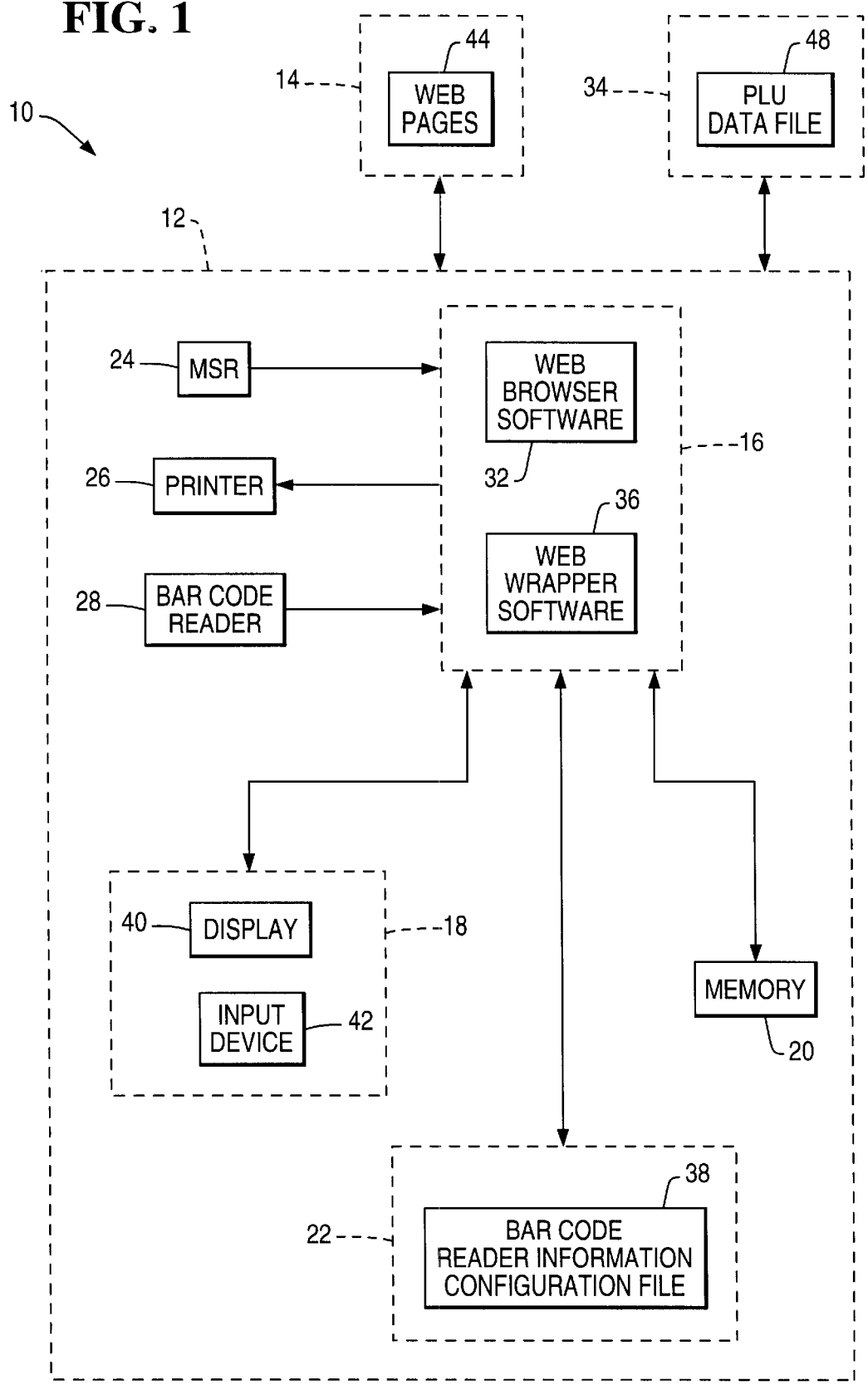
FIG. 1 is a block diagram of a transaction processing system including a network kiosk.

Turning now to FIG. 1, transaction system 10 includes kiosk 12 and network 14. Kiosk 12 is preferably located within a transaction establishment, such as a retail store, or transaction environment, such as a shopping mall. Kiosk 12 may include an NCR 7401 computer.

Kiosk 12 primarily includes processor 16, touch screen 18, memory 20, and storage medium 22. Kiosk 12 may additionally include a number of peripherals, including magnetic strip reader (MSR) 24, printer 26, and bar code reader 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32 and web wrapper software 36.

Web browser software 32 allows an operator to access information and purchase products from retailers through network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "-k" command line option. This option hides toolbars and menubars to prevent operator access to those functions.

Web browser software 32 retrieves and displays web pages 44 from network 14, which includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Under the present invention, web wrapper software 36 additionally enables bar code reader 28 when web browser software 32 is displaying a web page which contains fields for storing recorded bar code information or hypertext links to other content, including web pages, which rely on recorded bar code information. Web wrapper software 36 then enables input to those hypertext fields or links. A listing of web pages which are associated with bar code information may be coded into web wrapper software 36 or listed in bar code information configuration file 38 to allow a kiosk owner to control operation.

Touch screen 18 includes display 40 and input device 42. Display 40 and input device 42 may also be separate units. Input device 42 may record personal information from an operator.

Memory 20 is used by processor 16 to store executed program information, including web wrapper software information.

Storage medium 22 stores software including web wrapper software 36.

MSR 24 reads loyalty, credit, debit, SMART, and/or other types of cards carried by an operator. MSR 24 may record personal information from an operator.

Printer 26 prints information from web wrapper software 32, including information on web pages 44 from network 14. For example, printer 26 may print information relevant to a transaction completed by an operator using kiosk 12.

Bar code reader 28 reads bar codes on products to obtain product identification numbers. Kiosk 12 queries transaction server 34 with the identification numbers to obtain some information about the product from price look-up (PLU) file 48 (and possibly additional files) and displays the information.

Figure 2:
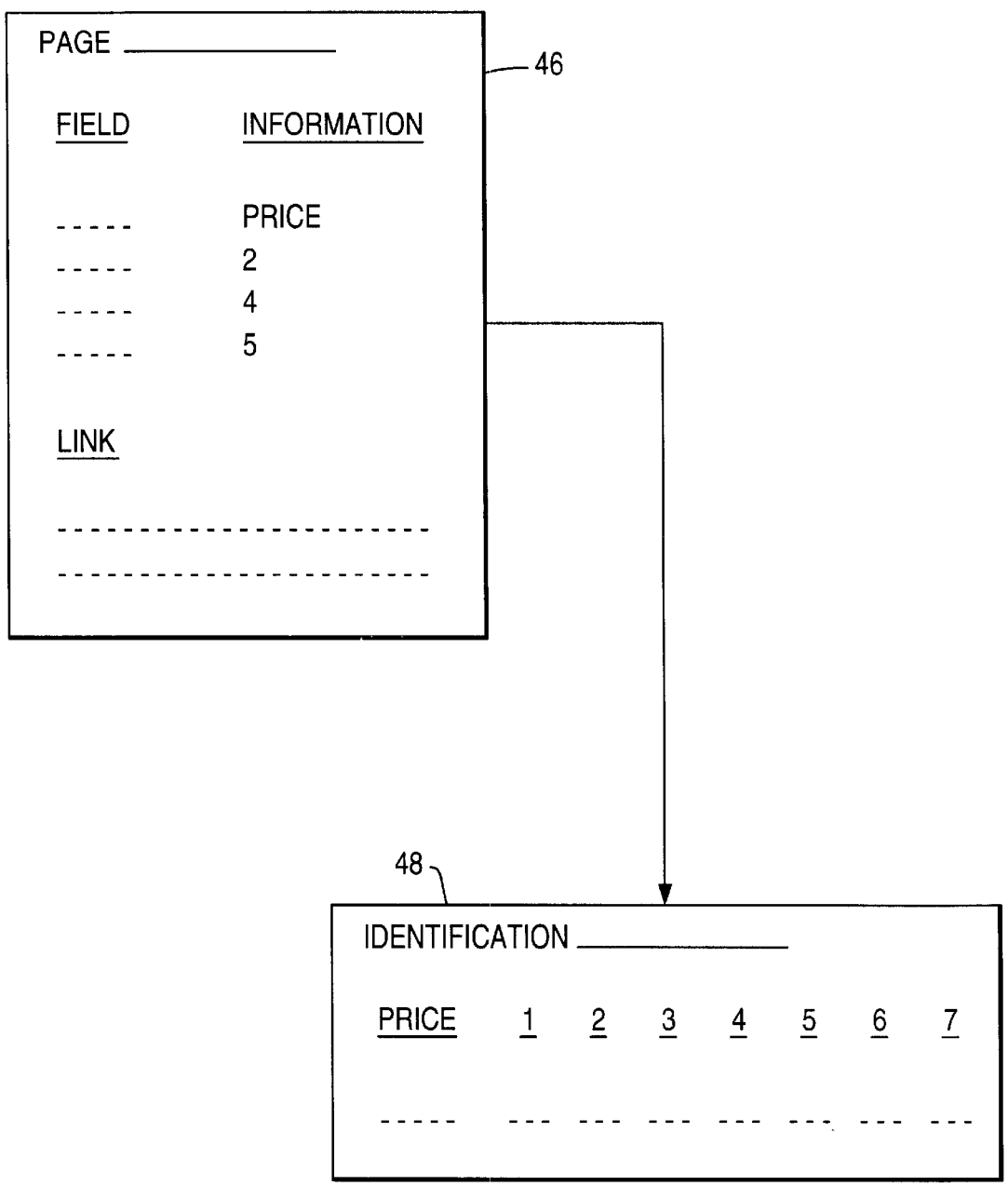
FIG. 2 is a depiction of a bar code information configuration file and a price look-up file.

Turning now to FIG. 2, bar code information configuration file 38 includes record 46 for each web page 44 that contains fields for storing recorded bar code information or hypertext links to other content, including web pages, which rely on recorded bar code information. Each record 46 includes entries PAGE, LINK, FIELD, and INFORMATION.

Entry PAGE identifies a particular web page 44 which contains fields for storing recorded bar code information or hypertext links to other content, including web pages, which rely on recorded bar code information.

Entry LINK identifies hypertext links in each web page 44 identified in bar code information configuration file 38, including links to web pages, which rely on recorded bar code information. These links are functional only when web wrapper software 36 has enabled reading of bar codes by bar code reader 28.

Entry INFORMATION identifies product information obtained from PLU data file 48 (and/or other files) through transaction server 34 by web wrapper software 36 in response to reading of bar codes by bar code reader 28. Data in entries INFORMATION map to some or all of the entries in PLU data file 48.

Entry FIELD identifies fields in each web page 44 identified in bar code information configuration file 38 which are mapped to the retrieved information from PLU data file 48 through entries FIELD.

Each record 50 in PLU data file 48 includes entries IDENTIFICATION, PRICE, and other information entries illustrated as entries 1–7.

Entry IDENTICATION includes a unique identifier for each product in a store.

Entry PRICE includes price information for a product.

Other information entries 1–7 include information when appropriate for the product. For example, additional information for some items may include weight information and sale information.

In operation, web wrapper software 36 compares an address of a displayed page to entries PAGE in bar code information configuration file 38. If the address of the displayed page is located within bar code information configuration file 38, web wrapper software 36 enables reading of bar codes by bar code reader 28 and data storage in fields for storing bar code information. Web wrapper software 36 obtains recorded bar code item identification information from bar code reader 28, obtains information under entries INFORMATION from PLU data file 48 (and possibly additional files), and uses the mappings of entries INFORMATION to entries FIELD to display the retrieved information in fields in the displayed web page. Web wrapper software 36 also enables hypertext links under entries LINK.

Figure 3B:
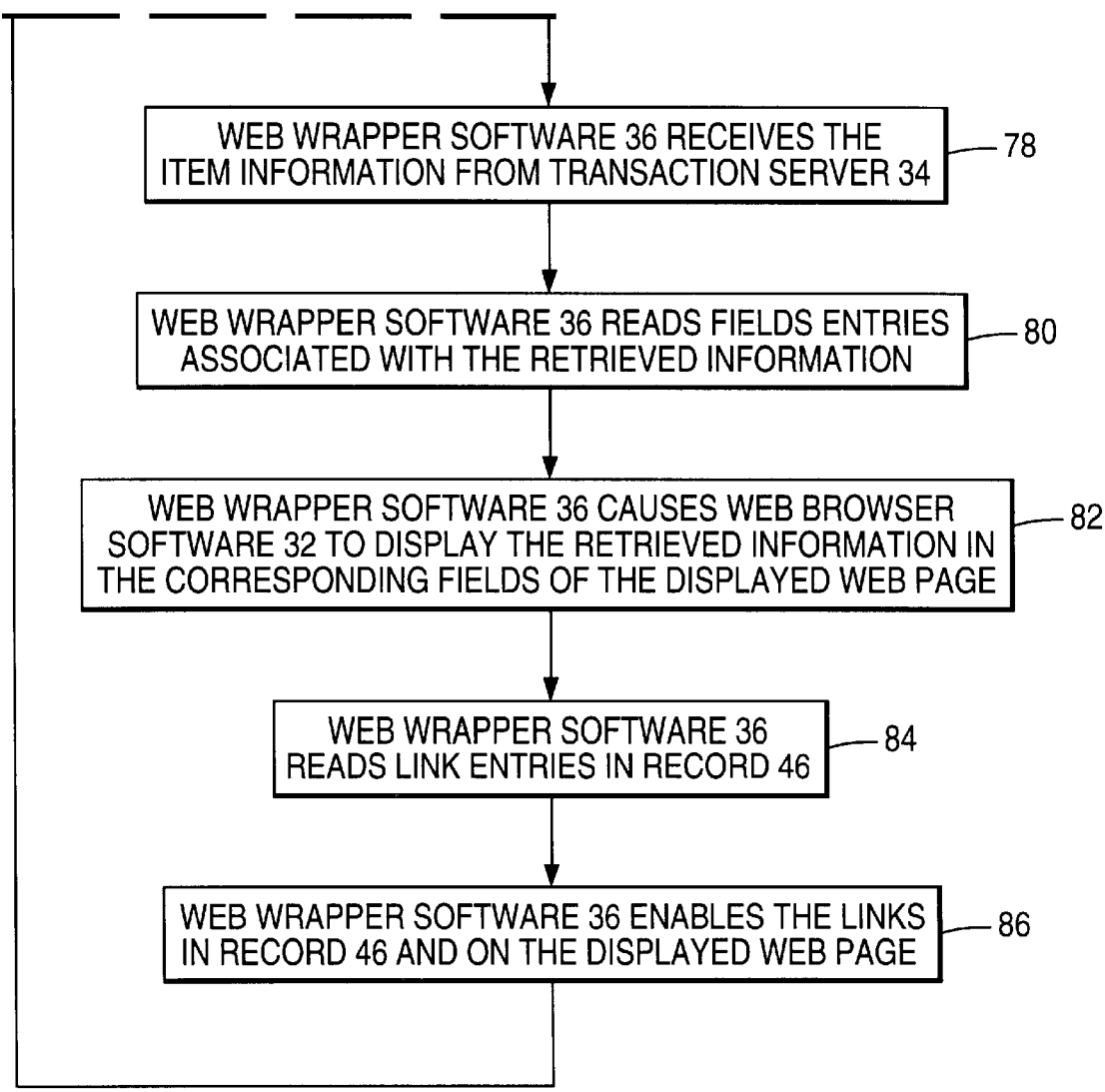

Turning now to FIG. 3, the method of the present invention is illustrated beginning with START 60.

In step 62, web wrapper software 36 waits for another web page to be displayed.

In step 64, web wrapper software 36 obtains an address for a displayed web page.

In step 66, web wrapper software 36 reads records 46 in bar code information configuration file 38.

In step 68, web wrapper software 36 compares PAGE entries in records 46 with the address of the displayed page. If one of the PAGE entries in records 46 is the same as the address of the displayed page, operation proceeds to step 70. Otherwise, operation returns to step 62 to wait for another web page to be displayed.

In step 70, web wrapper software 36 enables reading of bar codes by bar code reader 28 and displays a prompt to the operator to use bar code reader 28.

In step 72, web wrapper software 36 receives item identification information from bar code reader 28.

In step 74, web wrapper software 36 reads INFORMATION entries in record 46 to determine item information to retrieve. In the example in FIG. 2, record 46 includes price information, and information from entries 2, 4, and 5 in PLU data file 48.

In step 76, web wrapper software 36 sends a request for the item information to transaction server 34.

In step 78, web wrapper software 36 receives the item information from transaction server 34.

In step 80, web wrapper software 36 reads FIELD entries associated with the retrieved item information under INFORMATION entries in record 46 to determine where the item information should be displayed. In the example in FIG. 2, price information maps to the first field, information from entry 2 maps to the second field, information from entry 4 maps to the third field, and information from entry 5 maps to the fourth field.

In step 82, web wrapper software 36 causes web browser software 32 to display the retrieved item information in the corresponding fields of the displayed web page. Web wrapper software 36 automatically populates the fields with the retrieved data.

In step 84, web wrapper software 36 reads LINK entries in record 46.

In step 86, web wrapper software 36 enables the links in record 46 on the displayed web page.

Operation then returns to step 62 to wait for another web page to be displayed.

Although the present invention has been described with particular reference to certain preferred embodiments thereof, variations and modifications of the present invention can be effected within the spirit and scope of the following claims.

We claim:

1. A bar code processing method for a network kiosk comprising the steps of:

displaying a web page containing a number of locations for displaying first information about an item;

displaying a prompt associated with the web page to have an operator use a bar code reader to read a bar code on the item;

receiving second information from the bar code reader which identifies the item;

obtaining the first information about the item using the second information; and displaying the first information in the locations.

2. A bar code processing method for a network kiosk comprising the steps of:

displaying a web page associated with an item;

displaying a prompt associated with the web page to have an operator use a bar code reader to read a bar code on the item;

receiving information from the bar code reader which identifies the item;

determining a number of links to web content associated with the item in the web page; and enabling the links.

3. A bar code processing method for a network kiosk comprising the steps of:

displaying a web page including a number of locations for displaying information about an item;

displaying a prompt associated with the web page to have an operator use a bar code reader to read a bar code on the item;

receiving first information from the code reader which identifies the item;

obtaining second information about the item from a price file in a transaction server using the first information;

determining a first location in the web page for displaying the second information; and displaying the second information in the first location.

4. A bar code processing method for a network kiosk comprising the steps of:

displaying a web page including a number of locations for displaying information about an item;

activating a bar code reader;

displaying a prompt associated with the web page to have an operator use the bar code reader to read a bar code on the item;

receiving first information from the code reader which identifies the item;

obtaining second information about the item using the first information and a price file associated with a transaction server;

determining a first location in the web page for displaying the second information; and displaying the second information in the first location.

5. A network kiosk comprising:

a display for displaying a web page containing a number of locations for displaying information about an item;

a bar code reader for reading a bar code on the item to obtain first information identifying the item; and a computer which displays the web page, activates the bar code reader, displays a prompt associated with the web page to have an operator use the bar code reader to read the bar code on the item, receives the first information from the code reader, obtains second information about the item using the first information and a price file associated with a transaction server, determines a first location in the web page for displaying the second information, and displays the second information in the first location.

6. A bar code processing method for a network kiosk comprising the steps of;

displaying a web page associated with an item;

displaying a prompt associated with the web page to have an operator use a bar code reader to read a bar code on the item;

receiving information from the bar code reader which identifies the item;

determining a number of links to web content associated with the item in the web page; and enabling the links.

7. A bar code processing method for a network kiosk comprising the steps of:

displaying a web page associated with an item;

displaying a prompt associated with the web page to have an operator use a bar code reader to read a bar code on the item;

receiving information from the bar code reader which identifies the item;

obtaining additional information about the item using the information which identifies the item; and displaying the additional information in a number of locations in the web page designated to display the additional information.

* * * * *